July 7, 1959

H. T. HOFFMAN ET AL 2,893,634

THREE DIMENSIONAL CALCULATOR

Filed Nov. 15, 1956

INVENTORS
HOWARD T. HOFFMAN
DONALD K. SPEED
BY AND RICHARD F. JANOFSKY

Arthur L Wade
ATTORNEY

United States Patent Office 2,893,634
Patented July 7, 1959

2,893,634

THREE DIMENSIONAL CALCULATOR

Howard T. Hoffman, Mentor, Donald K. Speed, Painesville, and Richard F. Janofsky, Willoughby, Ohio, assignors to Bailey Meter Company, a corporation of Delaware Application November 15, 1956, Serial No. 622,399

5 Claims. (Cl. 235—151)

This invention is generally related to the problem of manifesting a variable state, or condition, having a plurality of varying characteristics. The state, or condition, is referred to as the dependent variable by reason of its manifestation being functions of its plurality of independent variable characteristics. In the disclosed embodiment, the independent characteristics of temperature and pressure of a fluid medium are utilized as the plurality of characteristics upon which enthalpy of the fluid medium depends.

Generally, one of the independent variables has a greater effect on the dependent variable than the other independent variables. The variable with the greatest relative effect is referred to as the major independent variable.

It is to be appreciated that the two independent variables of the embodiment disclosed and the resulting dependent variable are selected merely for the purposes of formulating an understanding of the embodiment of the invention disclosed. The fact must not be lost sight of that the principles disclosed herein are applicable to conditions having more than two independent variables. Further, the manifestation of the dependent variable includes use of a structure responding to the manifestation for control as well as for indicating and recording.

It is a primary object of the invention to adopt the technique of substituting, for a complex mathematical relationship of several variables, a combination of functions of single variables in a multiplicative and/or additive manner which is ideally suited for resolution by analog computing means.

It is an additional object of the invention to utilize relatively simple analog computing mechanisms to individually respond to the independent variables in actuating a unitary mechanism to manifest the dependent variable.

It is an additional object of the invention to achieve a unitary manifestation of a dependent condition, such as enthalpy of a fluid medium, having a complex mathematical relation with its independent variables by the use of servo mechanisms as examples of analog computing mechanisms.

Figure 1:
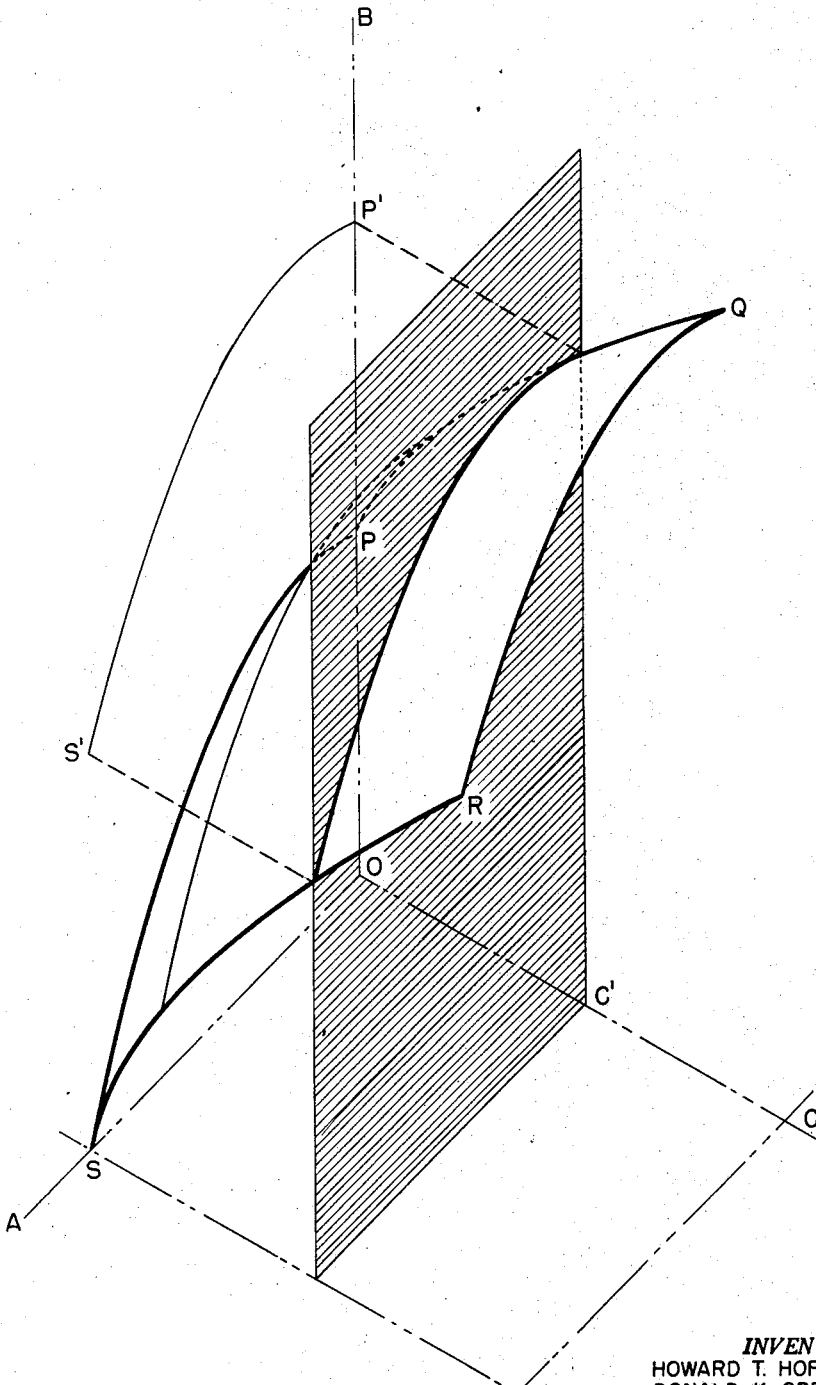
Fig. 1 is a three-dimensional representation of the variation of a dependent variable having two independent variables.

Referring specifically to Fig. 1, there is shown a three-dimensional representation of a surface depicting the value of enthalpy of a fluid medium over ranges of its temperature and pressure. The more fundamental appreciation of the complexity of the interrelation between the variables is gained from an analysis of Fig. 1.

An analysis of Fig. 1 begins with a consideration of mathematical calculations generally. Selection of form for the mathematical expressions constitutes a fundamental decision in view of the limitations of the analog computing structure which will operate in accordance with the mathematical expression.

Assigning the variables identifying letters, it can be appreciated that dependent variable B may be the result of the interrelation between independent variables A and C. Mathematically, the expression is simply (1) $$B = f(A, C)$$

Accepting the limitation of evaluating B over a small range of the values of the independent variables A and C, it is probable that the function of the two variables may be approximated by simple combinations of complex functions of each variable.

(2) $$B = f(A, C) \approx \sum_{N=1}^{\infty} f_N(A) f_N(C)$$

of which (3) $$B \approx f(A) + f(C)$$
$$B \approx f(A) f(C)$$
$$B \approx f(A) + f(C) f(A)$$

are special forms.

There is, of course, no difficulty in relating these general terms to the dependent variable of enthalpy and the independent variables of temperature and pressure of a fluid medium. Further, it can be appreciated that both independent variables do not have the same effect on enthalpy. Therefore, temperature may be specifically referred to as the major independent variable and pressure as the minor independent variable.

Specific reference may now be made to Fig. 1. The complex, three-dimensional surface, may be referred to as the enthalpy surface. A predetermined portion of the enthalpy surface is specifically represented within the boundaries of curves PQRS. The three axes with which the surface PQRS is oriented represent the three variables. The surface is determined from empirical data. It is quite complex from both a mathematical and graphical consideration. Only an experienced mathematician is capable of formulating a mathematical expression which can be resolved to ascertain the value of surface points in terms of the major and minor variables.

The surface bounded by PQRS might be represented by a complex relationship such as (4) $$\alpha B^3(\beta A^2 + \gamma C^2 + \delta B^2)^2 - \epsilon C(\zeta B^2 + \eta C^2)^2 = 0$$

Obviously this equation is too complex for the relatively simple computation by analog methods. With mathematical experience with surfaces represented by Fig. 1 an equation was written with a selected form of three parts, each part containing but one variable.

$$\phantom{(5)\quad B = (a+bC} \text{I} \phantom{+dC^2)+} \text{II} \phantom{(e+fA} \text{III}$$

(5) $$B = (a + bC + dC^2) + (e + fA + gA^2)(mC^{-2})$$

Admittedly this equation is only an approximate representation of the enthalpy surface, but it is a practical form for resolution by servo mechanisms responsive to the independent variables.

Part I of Equation 5 is the approximate expression representing the curve PQ, the intersection of the enthalpy surface with plane BOC. Value C', along axis OC defines a plane, parallel to plane BOA, intersecting curve PQ and the enthalpy surface. The intersection of the plane of C' is selected as containing the point on the enthalpy surface being located.

Part II of Equation 5 is an approximate expression for curve P'S', which is the enthalpy surface intersection with the plane at C'. Projected on the surface BOA, intersection P'S' is a function of A and B.

It must next be appreciated that a projection of the enthalpy surface intersection with the planes of other values along OC into the AOB plane gives other curves which are not expressed by part II of Equation 5. It therefore becomes a conclusion that a slight modification of part II of Equation 5 is necessary to describe the enthalpy surface more exactly. This modification is accomplished by part III of Equation 5.

This procedure for analyzing the three dimensional relation between the independent variables and the dependent state they establish, permits the use of analog computing techniques in approximating the function of the variables. Essentially, a single electric network can be made to respond to the independent variables and rebalanced to manifest the value of the dependent variable. Specifically, the major relationship between the dependent variable and the major independent variable is established in the network and the minor independent variable relationship with the dependent variable made to modify it. The modifying relationship is in turn modified by a minor relationship between the dependent variable and the first, or major, independent variable.

Figure 2:
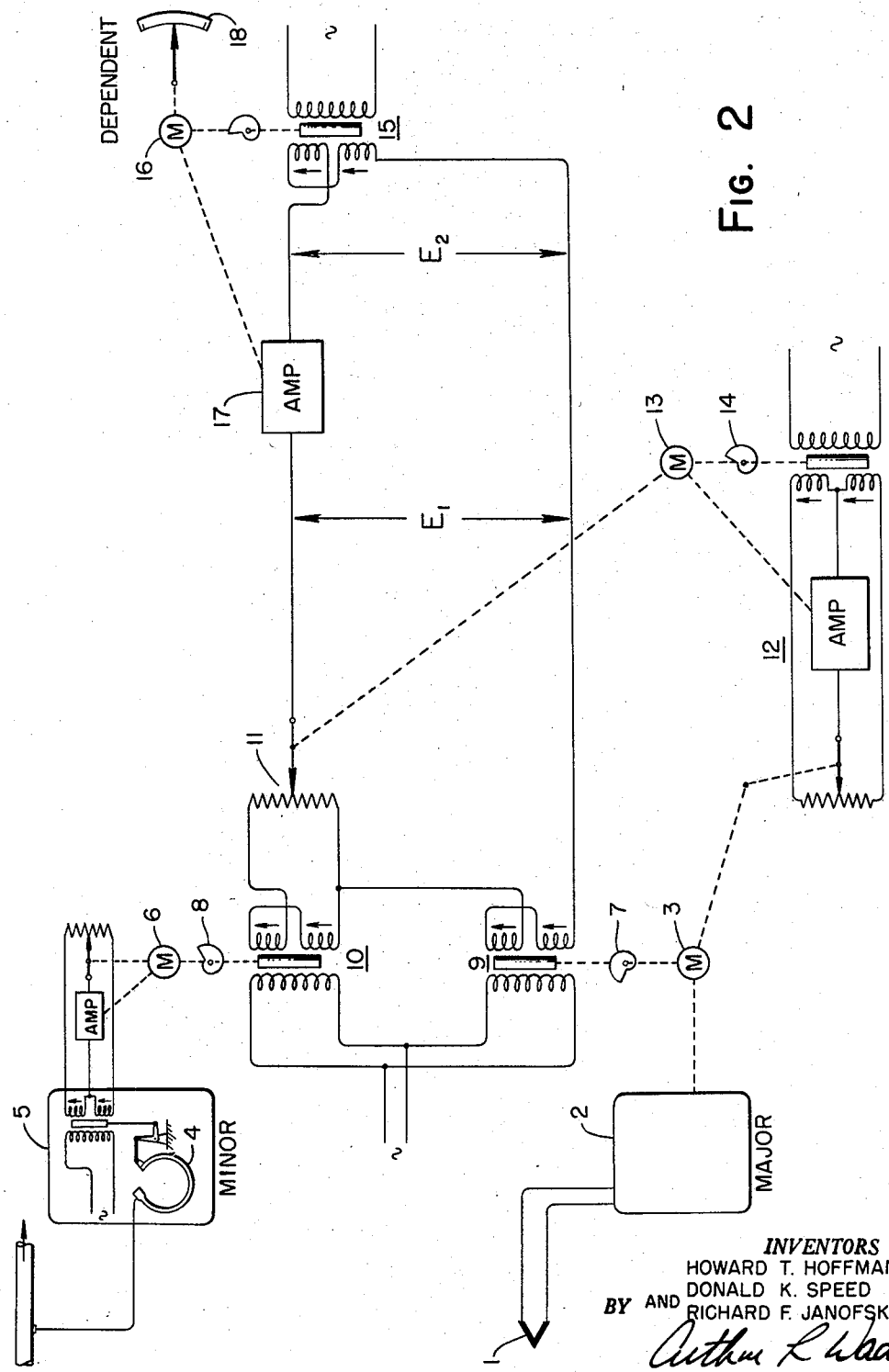
Fig. 2 is a diagrammatic representation of an electric calculating network utilizing servo mechanisms embodying the present invention.

Referring specifically to Fig. 2, there has been disclosed a balanceable electric network utilized in the analog computation of a dependent variable with two independent variables. Specifically, this electric network is responsive to a major independent variable and a minor independent variable in order to produce a manifestation of the single dependent variable. In actual practice, the network of Fig. 2 is responsive to temperature of a fluid as the major independent variable and pressure of the fluid as the minor independent variable to continuously manifest the enthalpy of the fluid as the dependent variable.

Specifically, servo mechanisms are utilized, characterized by reversible balancing motors, to respond to the temperature and pressure. A thermocouple 1 is diagrammatically represented as transmitting its signal into meter 2 for the control of servo motor 3. Bourdon tube 4 is diagrammatically illustrated as responsive to pressure in order that its signal may be transmitted into meter 5 for control of servo motor 6. In both instances, servo motors 3 and 6 are positioned in accordance with variations in the major independent variable temperature and the minor independent pressure.

In order that the motion imparted by motors 3 and 6 bear the desired functional relations to the pressure and temperature, cams 7 and 8 are actuated by the motors. The profiles of these cams may be shaped in order that the motion be imparted in accordance with parts I and II of Equation 5. Cams 7 and 8 form a part of the mechanical linkage between motors 3 and 6 in order to impart the correct functional motion to the cores of movable core transformers 9 and 10. The result is the production of voltage outputs from the secondaries of transformers 9 and 10 representative of the desired functional relationships between the independent variables to which thermocouple 1 and Bourdon tube 4 are responsive.

As indicated, the shape of the profiles of cams 7 and 8 determine the characteristics of the outputs of transformers 9 and 10. These voltages, analogs of the independent variables, conform to part I and part II of Equation 5. This is possible, because there are no limitations to the type or characteristics of the functions performed by the cam profiles except that they must be single valued and the functions expressed must be capable of production within the mechanical limitations of the profile shape.

The balanceable network of Fig. 2 is arranged to algebraically add the voltage outputs of transformers 9 and 10. This function is in accordance with Equation 5. The major relationship between the dependent variable and the major independent variable is established in the network and the minor independent variable relationship with the dependent variable made to modify it. It is next necessary to modify the minor independent variable relationship with the dependent variable by a minor relationship between the dependent variable and the first, or major, independent variable. Specifically, potentiometer 11, shunted across the output of transformer 10 is a mechanism through which this is accomplished.

With potentiometer 11 shunted across the output of transformer 10, the function of pressure produced by transformer 10 is modified by the desired function of temperature in accordance with part III of Equation 5. To determine this second function of temperature, servo motor 3, primarily responsive to the temperature to which thermocouple 1 is subjected, is utilized.

As diagrammatically illustrated, servo motor 3 simultaneously actuates cam 7 and an element of balanceable electric network 12. Network 12 is a familiar form of balanceable network in which the ratio of voltages established by a potentiometer are matched by the ratio of voltages established by a movable core transformer. Unbalance between the ratios is imposed upon an amplifier motor control network which actuates motor 13. Motor 13 positions cam 14 to adjust the core of the transformer of network 12 until a rebalance in the ratio of voltage is re-established. The profile of cam 14 determines the motion of motor 13 in accordance with part III of Equation 5.

Motor 13, positioned in accordance with the requirements of the profile of cam 14, to rebalance the network 12, is simultaneously used to position potentiometer 11. Thus, potentiometer 11 shunts the output of transformer 10 to effect a multiplication in accordance witth the part II and part III multiplication of Equation 5.

Analog voltage $E_1$ of Fig. 2 is formed in accordance with the complete Equation 5. With voltage $E_1$ balanced by voltage $E_2$, in the network of Fig. 2, the position of its balancing servo element becomes representative of the dependent variable. Voltage $E_2$ is illustrated as the output of a variable electric source, specifically movable core transformer 15. The core of transformer 15 is positioned by servo motor 16 which is controlled by the output of amplifier motor control unit 17, responsive to the unbalance between voltages $E_1$ and $E_2$. The resulting positions of motor 16 are manifested by actuating an indicator over scale 18. It is, of course, understood that this positioning action of motor 16 may be utilized to record the value of enthalpy or control mechanisms in accordance with the magnitude of enthalpy.

The mathematical analysis of the problem, and its solution, was correlated with the three dimensional representation of the environment of the problem. This correlation was followed with a disclosure of the actual apparatus needed to practically manifest the dependent variable as a function of its independent variables. There appears to be some virtue in representing the calibrating technique of the structure of Fig. 2 by means of a two dimensional graphical analysis.

Figure 3:
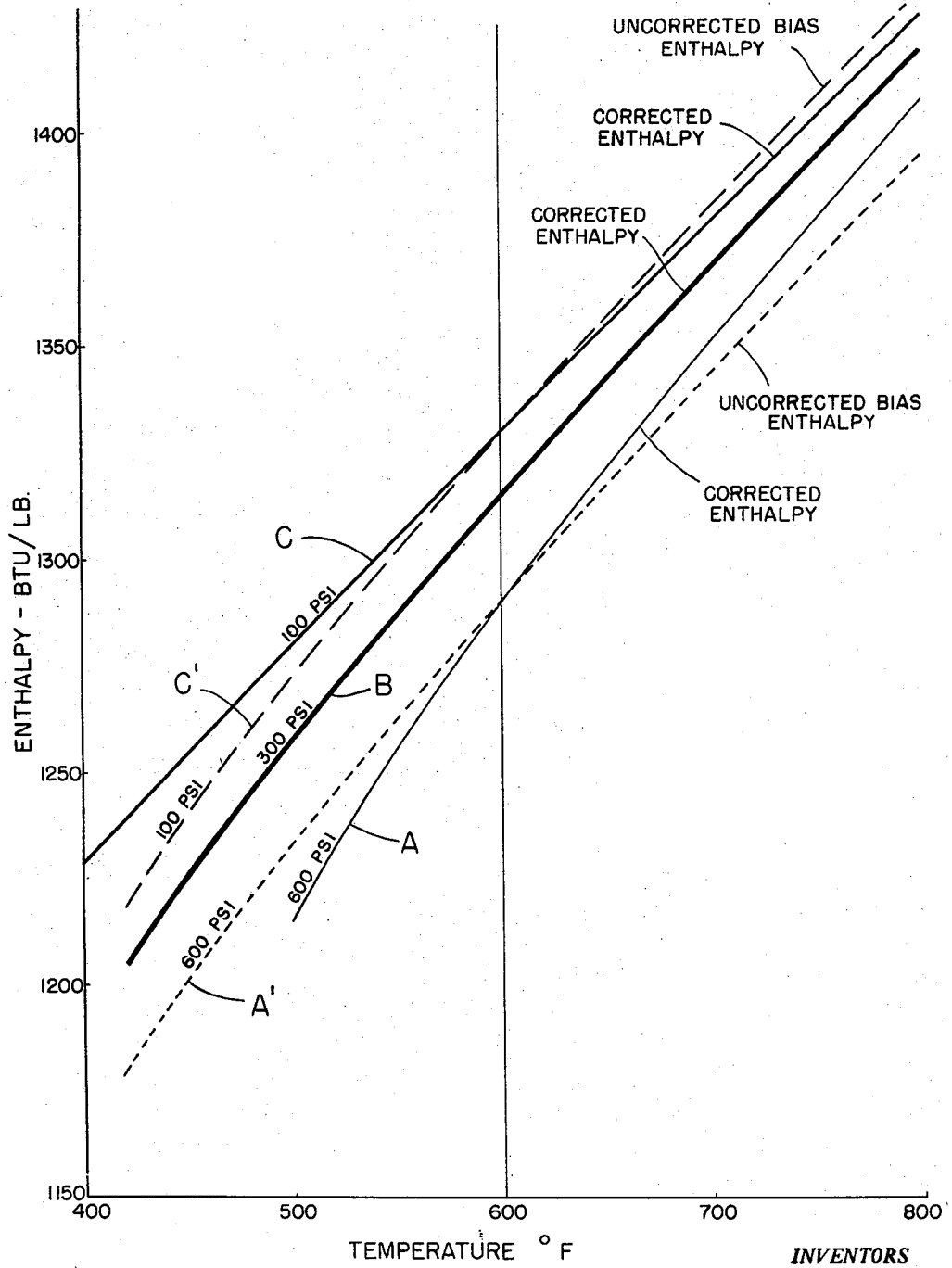
Fig. 3 is a two-dimensional representation of the operation of the embodiment of Fig. 2 over a selected range of independent variables.

Reference is made, concomitantly, to Figs. 2 and 3. It is assumed that cam 7 has been shaped to provide the correct manifestation of enthalpy when the pressure is at 300 p.s.i. The temperature can then swing over the 400 to 800 F. range and enthalpy will be correctly manifested, in accordance with curve B, as long as the pressure remains constant at 300 p.s.i.

Cam 8 is next shaped to correctly manifest enthalpy when the temperature remains constant at 600 F. The pressure can swing over the 100 to 600 p.s.i. range and enthalpy will be manifested correctly along the vertical axis of Fig. 3 at 600 F. If the algebraic addition of the analog voltage outputs of transformers 9 and 10 were to be considered as the sole source of voltage $E_1$, simultaneous deviations in pressure and temperature from a 600 F. and 300 p.s.i. calibrations would result in errors in the final manifestation of enthalpy. Potentiometer 11, and its actuating mechanism, is needed to make the final manifestation of enthalpy correct.

Additional analysis of a voltage $E_1$ as the algebraic addition of the outputs of transformers 9 and 10 is made on Fig. 3. Considering fixed pressure deviation from the design value of 300 p.s.i., the output of transformer 10 becomes a constant bias of the output of transformer 9. In representation of this bias, curves at 100 and 600 p.s.i. are drawn as curves C' and A'. Curves A and C are the correct values of enthalpy as a function of temperature at 600 p.s.i. and 100 p.s.i. respectively. Curves A and A' coincide at 600 F. and curves C and C' coincide at 600 F. Shunting potentiometer 11, varies the size of the analog pressure correction value as a function of temperature. The result is a manifestation of enthalpy which follows curves A and C as well as B over the 100 to 600 p.s.i. and 400 to 800 F. ranges.

Admittedly, the three servo mechanisms do not resolve the interrelation between the dependent and the independent variables with the complete accuracy of theory. The resolution is approximate, but can be made to fall within practical accuracy over a selected range of enthalpy, here shown as 120 to 1400 B.t.u. per pound. Additional servo motors could be added to this basic calculating network in the same manner as servo motor 13. Addition of such motors would be obvious extensions of the principles illustrated and explained supra.

Again it is emphasized that the enthalpy manifestation is disclosed as practically embodied in the positioning action of motor 16 which actuates an indicator over scale 18. As pointed out supra, this actuation may obviously be utilized to indicate, record or control as enthalpy varies in magnitude. Without this continuous manifestation, engineers have had to refer to tables or charts prepared from original calculations to ascertain the magnitude of enthalpy at observed values of pressure and temperature. The utility of a mechanism automatically and continuously supplying this value is obvious. The performance of apparatus producing fluid with desired enthalpy levels can be controlled in their maintenance of the required values of the independent values of temperature and pressure. The fluctuation of enthalpy levels can be observed if the values of temperature and pressure are not subject to control, or are limited in some way. Application engineers are thereby given a valuable operating guide and design engineers are supplied a valuable tool for building fluid producing apparatus.

What we claim as new and desire to secure by Letters Patent of the United States, is:

1. A system for continuously manifesting a variable dependent upon a plurality of independent variables comprising, a balanceable electric network, a first transformer having a primary winding structure connected to an alternating voltage source, a secondary winding structure connected in said balanceable network, and a core member movable for varying the voltage induced in the secondary winding structure from the source, a first measuring device responsive to a first of the independent variables for positioning said core member to establish a first voltage across said secondary winding structure in accordance with a function of said first independent variable, a second transformer having a primary winding structure connected to the source of alternating voltage, a secondary winding structure connected in said balanceable network, and a core member movable for varying the voltage induced in the secondary winding structure, a second measuring device responsive to a second of the independent variables for positioning said core member of said second transformer to establish across said secondary winding structure of said second transformer a voltage which is in series adding relationship with said first voltage and proportional to a first function of said second variable, a potentiometer shunted across said secondary winding structure of said first transformer and having a movable contact, means associated with said second measuring device for actuating said contact to position said contact in accordance with a second function of said second variable to modify said first voltage in accordance with said second function of said second variable and to render said first voltage proportional to the product of said function of said first variable and said second function of said second variable, and means responsive to the sum of said first and second voltages to effect balance of said network to continuously manifest the dependent variable as the sum of the first function of said second independent variable and the product of the function of said first independent variable and second function of said second variable.

2. The system of claim 1 wherein each of said measuring devices comprises, a balanceable electric network, a servomotor connected to the output of the balanceable network, and a cam positioned by said motor and operatively connected to the movable core member actuated by the measuring device.

3. The system of claim 1 wherein the means associated with said second measuring device comprises a balanceable electric network, a motor operatively connected to the contact arm of said potentiometer positioned by the network, said second function of said second variable being produced by cam actuated by the motor.

4. The system of claim 1 in which the said balanceable electric network and means responsive to the sum of said first and second voltages comprise a servomotor responsive to the network unbalance, and a cam actuated by the motor for positioning the movable core of a movable core transformer arranged to supply a balancing voltage to said network.

5. The system of claim 1 in which the first measuring device responds to the pressure of a fluid, the second measuring device responds to the temperature of the fluid, and the dependent variable manifested is the enthalpy of the fluid.

References Cited in the file of this patent

UNITED STATES PATENTS

| | | |
|---|---|---|
| 2,636,151 | Hornfeck | Apr. 21, 1953 |
| 2,689,477 | Hornfeck | Sept. 21, 1954 |
| 2,714,309 | Redemske | Aug. 2, 1955 |

OTHER REFERENCES

Transactions of the AIEE (Hornfeck) vol. 71, part I, pages 183–193, July 1952.